United States Patent [19]

Yokoyama

[11] Patent Number: 5,360,622

[45] Date of Patent: Nov. 1, 1994

[54] METHOD AND APPARATUS FOR KNEADING POWDER, AND KNEADED MATERIAL

[76] Inventor: Ryosuke Yokoyama, 12-22, Suehirocho, Tsuruoka-shi, Yamagata, Japan

[21] Appl. No.: 598,643

[22] PCT Filed: Mar. 2, 1989

[86] PCT No.: PCT/JP89/00219

§ 371 Date: Oct. 17, 1990

§ 102(e) Date: Oct. 17, 1990

[87] PCT Pub. No.: WO90/09840

PCT Pub. Date: Sep. 7, 1990

[51] Int. Cl.⁵ .................. A21D 2/08; A21D 6/00
[52] U.S. Cl. .................. 426/549; 426/504; 426/524; 426/622
[58] Field of Search ............ 426/504, 549, 622, 524

[56] References Cited

U.S. PATENT DOCUMENTS 2,263,514  11/1941  Pahl .
5,034,237   7/1989  Suzuki ........................ 426/622

FOREIGN PATENT DOCUMENTS 0191864  7/1985  European Pat. Off. .
0241554  1/1986  European Pat. Off. .
0272880  12/1987 European Pat. Off. .
 856178  3/1940  France .
2195184  4/1972  France .
63-12242 1/1988  Japan .
85/00423 7/1985  WIPO .

OTHER PUBLICATIONS

Samuel A. Matz, PH.D., Equipment For Bakers, Pan-Tech International, Inc., 1988, pp. 101–109.
Japanese Appln No. 62-194329, Japanese Abstract, vol. 13, No. 223 (M-829) (3571) May 24, 1989.
Nikkei Architecture, Apr. 21, 1986, pp. 81–85.

*Primary Examiner*—Jeanette Hunter
*Assistant Examiner*—Mary S. Mims
*Attorney, Agent, or Firm*—Finnegan, Henderson, Farabow, Garrett & Dunner

[57] ABSTRACT

Disclosed are a powder kneading method and apparatus, in which a vermicelli-forming powder for the production of vermicelli or buckwheat vermicelli, a bread-forming powder or a soil powder for a soil paste for the production of a ceramic ware or the like is uniformly mixed with fine particulate ice, the ice in the powder-/ice mixture is melted in an atmosphere maintained at a temperature higher than 0° C. and a pressure is applied to the mixture to remove air contained in the interior of the mixture during or after the melting. Only by such simple operations, the powder can be uniformly kneaded with water, and a vermicelli or buckwheat vermicelli dough or a soil paste for a ceramic ware or a tile can be easily prepared in a very short time.

3 Claims, 3 Drawing Sheets

METHOD AND APPARATUS FOR KNEADING POWDER, AND KNEADED MATERIAL

TECHNICAL FIELD

The present invention relates to a powder kneading method and apparatus for kneading either wheat flour as the staring material for wheat vermicelli or bread or buckwheat flour with water for forming a dough or for kneading powdery soil with water for forming a soil paste for a ceramic ware or tile, in which such a dough or soil paste can be easily prepared in a short time, and also to a kneaded material.

BACKGROUND ART

A dough of vermicelli, buckwheat vermicelli or bread is prepared by kneading a starting powder such as wheat flour or buckwheat flour sufficiently with predetermined amounts of water and additives. As the conventional method for kneading such a powder with water, there is generally adopted a method in which predetermined amounts of the starting powder, water and additives are changed in a kneading vessel and the mixture is then kneaded manually or by using a machine.

In this conventional kneading method, kneading should be conducted for a long time in order to obtain a good dough having a softness resembling that of the earlobe, and especially in case of the manual operation, a considerably long time is required for kneading and the quality of the formed dough differs according to the manner of applying the force even if the kneading operation is conducted for the amount of time.

Furthermore, in the production of a ceramic ware or tile, the step of kneading soil with water for forming a starting soil paste is included, and as in the production of a dough of vermicelli, buckwheat vermicelli or bread, a considerably long time is required for kneading soil with water.

The present invention has been completed under this background, and it is therefore a primary object of the present invention to knead a powder with water easily in a very short time and obtain a high-quality dough or soil paste which is substantially uniform in the quality.

DISCLOSURE OF THE INVENTION

In accordance with the present invention, there is provided a powder kneading method comprising the mixing step of mixing a powder with fine particulate ice, the melting step of melting the fine particulate ice mixed in the powder, and the compressing step of applying a pressure to the mixture of the powder and fine particulate ice.

Furthermore, in accordance with the present invention, there is provided a powder kneading apparatus comprising, as shown in FIG. 1, mixing means A for mixing a powder with fine particulate ice, melting means B for melting the fine particulate ice mixed in the powder, and compressing means C for applying a pressure to the mixture of the powder and fine particulate ice.

According to the present invention, only by charging a powder and fine particulate ice into mixing means A, uniformly mixing them, melting the fine particulate ice in the mixture of the powder and fine particulate ice by melting means B and compressing the mixture for deflation by compressing means C after or simultaneously with the melting operation, an even homogeneous dough or soil paste for a ceramic ware can be simply prepared.

Incidentally, fine particulates ice includes snow.

When a powder is mixed with fine particulate ice by mixing means A, in order to prevent generation of water until the powder is mixed completely with fine particulate ice, it is preferred that the powder be cooled below 0° C. before it is charged in mixing means A. It also is preferred that the mixing operation be carried out in an atmosphere maintained at a temperature lower than 0° C., especially at a temperature of −30° to −5° C.

The compression for deflation can be carried out at the step of melting fine particulate ice or after this melting step. The compression force to be applied at the compressing step is sufficient to remove air from the interior of the mixture.

Melting of fine particulate ice mixed in the powder can be accomplished by natural melting, that is, by allowing the mixture to stand still in open air at a temperature higher than 0° C., or by heated melting, that is, by heating the mixture by heating means.

By using fine particulate ice having a finer size, especially powder snow, the kneaded mixture can be made more homogeneous.

For the powder, wheat flour and buckwheat flour can be used as the starting material of vermicelli powder, bread flour and Chinese vermicelli, and a soil powder can be used for a ceramic ware or tile, and any powder for the production of kneaded material by mixing with water can be used in the present invention.

In the present invention, additives can be incorporated when the powder is mixed with fine particulate ice. The additives can be added to the powder in advance or be incorporated into fine particulate ice in advance.

BRIEF DESCRIPTION OF THE DRAWINGS

FIGS. 3(A) and 3-(B) are diagrams illustrating a slice machine for preparing powder snow used in examples of the present invention;

EXAMPLES

Examples of the present invention will now be described.

EXAMPLE 1

| Materials | |
| --- | --- |
| wheat flour | 500 g |
| salt water (salt concentration = 10%) | 230 g |

Figure 1:
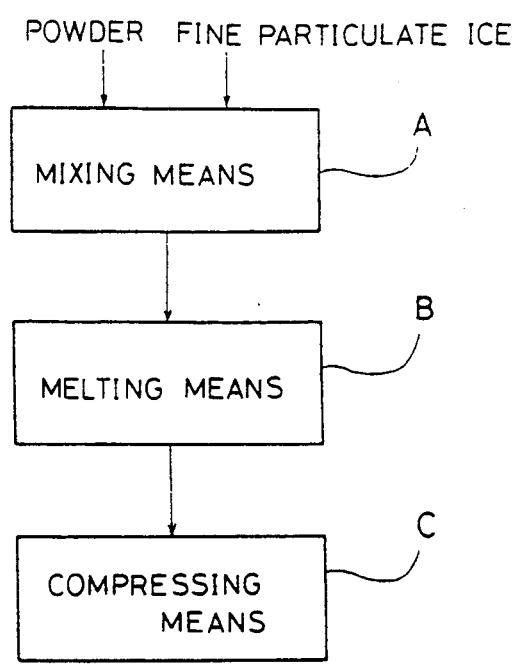
FIG. 1 is a block diagram illustrating the apparatus for kneading a powder according to the present invention.
Figure 2:
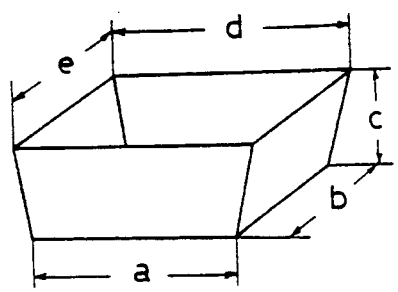
FIG. 2 is a diagram illustrating an ice-making vessel used in an example of the method for kneading a powder according to the present invention.

The salt water was charged in a saucer-like vessel shown in FIG. 2 (a=350 mm, b=250 mm, c=200 mm, d=400 mm and e=280 mm) formed of an iron plate and was kept in a freezing chamber maintained at −25° C. to effect freezing and form ice.

Figure 3:
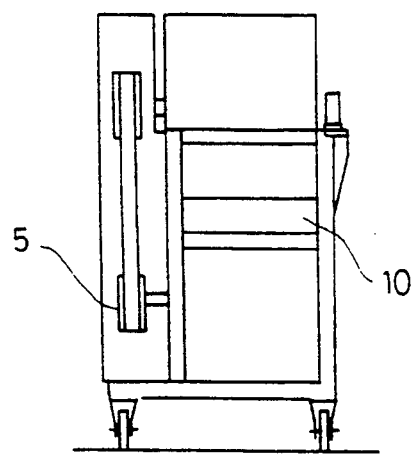
Figure 3:
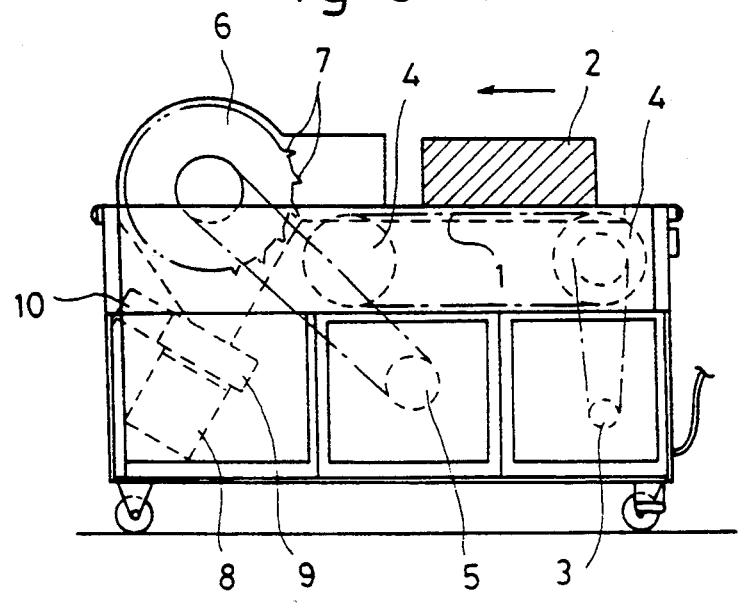

In a refrigerator, the formed ice was sliced by using a slice machine shown in FIGS. 3-(A) and 3-(B) to form powder snow.

The preparation of powder snow by the above-mentioned slice machine will now be described in brief.

Formed ice 2 is set on a chain conveyor 1, and a chain conveyor-driving motor 3 is driven to move the chain conveyor 1 hung between a pair of chain wheels 4 and to deliver ice 2 in the direction indicated by an arrow in the drawings. To form powder snow, delivered ice 2 is sliced by a projection 7 of a projection drum 6 rotated an driven by a drum-driving motor 5 arranged at the terminal end of the chain conveyor 1. Formed powder snow is blown out to the outside of the machine from an extrusion opening 10 by a blower 9 driven by a blower-driving motor 8.

Figure 4:
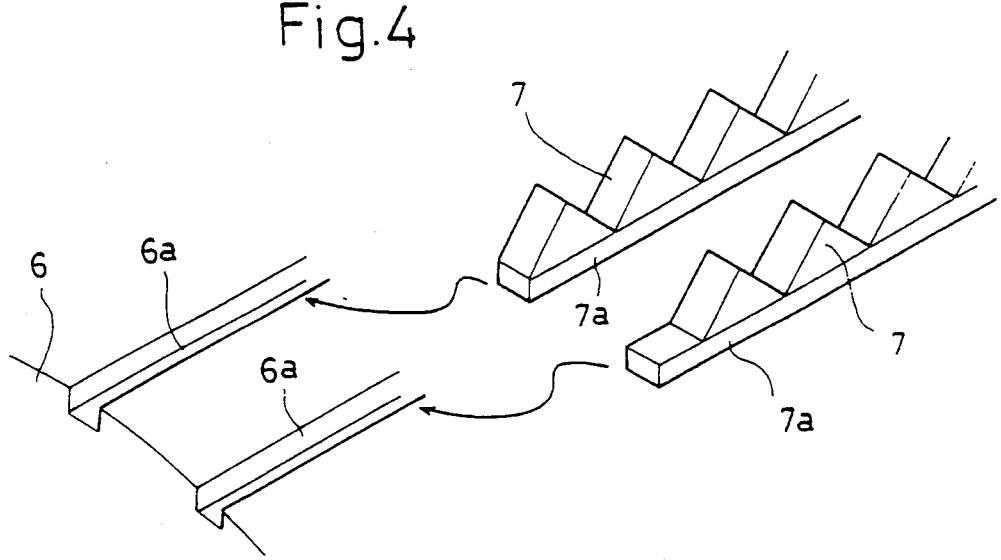
FIG. 4 is a diagram illustrating an attachment structure for a projection of a projection drum of the slice machine shown in FIGS. 3-(A) and 3-(B)

The projection 7 projection drum 6 has a flat, substantially triangular shape similar to that of a chip used for a cemented carbide tool, as shown in FIG. 4. Many projections 7 having such a shape are fixed in a line to a long plate 7a having a length almost equal to the length in the axial direction of the drum 6. These plates 7a are fitted and fixed into grooves 6a formed equidistantly in the circumferential direction of the drum 6. The plates 7a are arranged so that the projection 7 of one plate 7a is located between projections 7 of the adjacent plate 7a.

The driving conditions of the slice machine used in the present example are described below.

Electric Capacities of Respective Driving Zones
  projection drum: 5.5 KW
  blower: 2.2 KW
  chain conveyor: 0.2 KW
Powder Snow-Preparing Conditions
  outer diameter of projection drum: 550 mm
  drum revolution number (50 Hz): 813 rpm
  peripheral speed of drum: 1400 m/min
  feed speed of chain conveyor: 0.4 m/min Separately from the production of powder snow, wheat flour was cooled in advance for 2 hours in a refrigerator maintained at −5° C.

Then, 500 g of the cooled wheat flour and 230 g of the powder snow prepared from salt water ice were charged in an atmosphere maintained below 0° C. in a lidded vessel of wood shown in FIG. 5 (a=300 mm, b=200 mm and c=150 mm) and the wheat flour was mixed with snow powder by the mixing apparatus.

Figure 6:
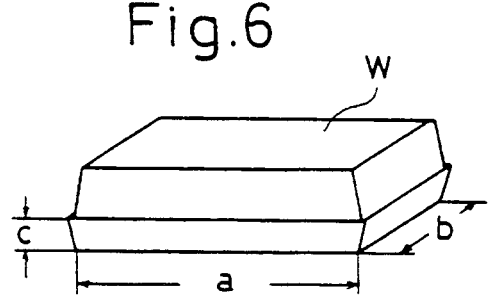
FIG. 6 is a diagram illustrating a vessel used at the powder snow melting step in examples of the present invention.

After the mixing, the wheat flour/powder snow mixture was charged in a wide-mouthed saucer-like vessel shown in FIG. 6 (a=400 mm, b=200 mm and c=30 mm), transferred into a chamber heated and maintained at 30° C. and allowed to stand still for about 90 minutes to melt the powder snow. When the powder snow was substantially melted, a transparent film was spread on the mixture and a weight W of 16 kg was placed thereon, and the mixture was thus compressed for 30 minutes. The compressing force applied at this step was such a pressure as to remove air from the interior of the mixture, and in the present example, the compressing force was 0.02 kg/cm$^2$ or 0.66 kg/cm$^3$. By this compression, deflation of the interior of the mixture was effected. In this state, the powder snow in the interior of the mixture was completely melted and uniformly diffused into the wheat flour. The formed vermicelli dough had a good softness resembling that of the earlobe.

EXAMPLE 2

| Materials | |
|---|---|
| Wheat flour | 1000 g |
| water | 400 g |

At first, the water was frozen in a freezing chamber to form ice.

In the same manner as described in Example 1, the formed ice was sliced by using the slicing machine to form powder snow in a refrigerator maintained at −10° C.

Separately from the production of snow powder, the wheat flour was cooled in advance in a refrigerator maintained at −5° C.

Then, the cooled wheat flour and the powder snow were charged in a vessel in an atmosphere maintained below 0° C. and were mixed by a mixing apparatus.

Figure 5:
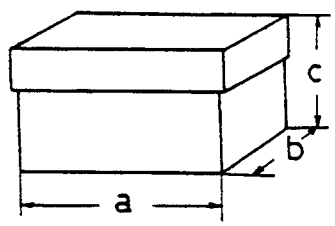
FIG. 5 is a diagram illustrating a vessel used in examples of the present invention for mixing a powder with powder snow.

After the mixing, the wheat flour/powder snow mixture was charged in the saucer-like vessel shown in FIG. 5 in the same manner as described in Example 1 and was transferred into a chamber maintained at 20° C, and a transparent film was spread on the mixture and a weight was placed thereon. A compressing force of 0.02 kg/cm$^2$ was applied to the mixture for deflation, and in this state, the mixture was allowed to stand still to completely melt the powder snow and diffuse it uniformly into the wheat flour. The withdrawn vermicelli dough had a good softness resembling that of the earlobe.

It is said that the reason why salt water is used for kneading a vermicelli dough is not that a taste is given to the dough but that the dough is rendered viscous. However, when Example 1 using salt water was compared with Example 2 not using salt water, it was found that there was no substantial difference of the viscosity between the vermicelli dough obtained in Example 1 and the vermicelli dough obtained in Example 2. It is considered that the reason is that the mixing property between powders is excellent over the mixing property between a powder and a liquid and if water is mixed in the form of fine particulate ice, preferably powder snow, with wheat flour and is then melted, water permeates into the wheat flour sufficiently and uniformly.

When granulated sugar-like snow (the particle size is about 0.5 mm) having a size coarser than powder snow is used, if the granulated sugar-like snow is incorporated in an amount of 45 to 46 parts by weight per 100 parts by weight of wheat flour and is then melted, there are formed a portion where water is not diffused into wheat flour and a portion in which water is diffused into wheat flour, and a uniform dough cannot be formed in this case. However, if the mixture is lightly crumpled under compression, a good dough can be formed.

EXAMPLE 3

| Materials | |
|---|---|
| wheat flour | 200 g |
| warm water (35° C.) | 5000 cc |
| sugar | 700 g |
| table salt | 100 g |
| egg yolk | 600 g |
| dry yeast | 170 g |

Sugar, table salt, egg yolk and dry yeast were dissolved in warm water, and the solution was frozen in a freezing chamber maintained at −25° C. over a period of 24 hours to form ice. Since the ice formed by freezing water in which the above additives had been incorporated did not become hard, the ice was finely pulverized in a freezing chamber maintained at −25° C. by using a pulverizer to form snow-like particles. The formed snow had a viscosity because of the presence of syrup covering the surfaces of the particles.

Separately, 200 g of wheat flour was placed in a freezing chamber maintained at −25° C. for about 1 hour and cooled to −10° C. in advance.

Then, 140 g of the snow was added to the cooled wheat flour, and the mixture was sufficiently stirred by using a stirrer in the freezing chamber so that lumps were not formed in the mixture.

The formed mixture was divided into portions, each having a weight of about 40 g. Then, each portion was enveloped with a transparent film to form a thin layer having a thickness of about 10 mm. If the mixture is formed into such a thin layer, the difference of snow-melting time between the interior portion and outer portion of the mixture can be diminished. Then, the thin layers were allowed to stand still in a room heated and maintained at 30° C. for 120 minutes, whereby the ice was melted. When the temperature of the mixture was elevated to 25° C., the mixture was lightly compressed by a compressing apparatus for deflation, whereby a bread dough having a fermentation smell before the primary fermentation was obtained.

Since the wheat flour/snow mixture was in the frozen state, fermentation of the yeast plant was controlled and therefore, the wheat flour/ice mixture could be stored for a long time, for example, in the state charged in a vessel. The bread dough could be prepared easily in a short time by thawing the stored mixture when baking of bread was desired.

The bread dough obtained in the present example was placed in an oven maintained at 30° C. for about 40 minutes to effect primary fermentation. At this stage, the volume of the dough was increased 2.5 to 3 times the original volume. After the primary fermentation, the dough was taken out from the oven and degassing was carried out, and the dough was allowed to stand still for about 10 minutes. Then, secondary fermentation was effected in an oven maintained at 40° C. over a period of about 30 minutes. At this stage, the volume of the dough was increased two times. Then, the temperature was elevated to 200° C. for about 10 minutes to effect baking and obtain bread.

EXAMPLE 4

| Materials | |
|---|---|
| wheat flour | 500 g |
| powder snow (salt water ice) | 230 g |

At first, 3 parts of a salt powder comprising carbonates and phosphates of sodium and potassium was dissolved in 100 parts by weight of water, and table salt was added to the solution to form salt water. The salt water was frozen in a freezing chamber maintained at −25° C. to form ice and powder snow was prepared from the ice by using the slice machine shown in FIG. 3.

Separately from the production of the salt water ice, wheat flour was cooled in a freezing chamber maintained at −10° C. in advance.

Then, the cooled wheat flour and the powder snow were charged in the vessel shown in FIG. 5 and mixed in a refrigerator maintained at −5° C. Then, the ice was melted in a chamber maintained at 30° C. and the mixture was compressed, whereby a Chinese vermicelli dough having an appropriate softness was obtained.

In the foregoing examples, powders for bread and vermicelli have been described. However, the present invention is not limited to the production of bread and vermicelli.

For example, the present invention can be applied to the production of a ceramic ware or tile. More specifically, a soil powder to be used for the production of a soil paste is mixed with fine particulate ice, preferably snow having a fine particle size, the ice in the formed mixture is melted and the mixture is compressed for deflation, whereby a soil paste can be easily prepared in a short time.

Furthermore, as pointed out hereinbefore, if a mixture of a powder and fine particulate ice is kept frozen in a vessel, the mixture can be stored for a long time period. Accordingly, in the production of a boiled fish paste and the like, if a mixture of ground fish meat with a seasoning is dried and powdered and a mixture of this powder and fine particulate ice is stored in the frozen state as a boiled fish paste-forming material, only a necessary amount of the mixture can be melted and used for the production. In this case, only by a heat treatment of melting and boiling the boiled fish paste-forming material, an intended boiled fish paste can be easily prepared, and the above-mentioned mixture can be provided as a material for a product requiring a kneading operation.

As is apparent from the foregoing description, according to the present invention, a vermicelli or bread dough having a high quality or a soil paste for a ceramic ware or tile can be prepared only by mixing fine particulate ice uniformly with a starting powder and then melting the fine particulate ice in the mixture, and therefore, a kneading operation, for which a long time is required in the conventional technique, becomes unnecessary.

INDUSTRIAL APPLICABILITY

As is apparent from the foregoing illustration, the method and apparatus for kneading a powder according to the present invention are very effective for increasing the manufacturing efficiency, reducing the manufacturing cost and improving the quality in food industries, for example, industries of the production of vermicelli and bread, and in industries of the manufacture of ceramic wares and tiles.

What is claimed is:

1. A powder kneading method comprising the steps of:
   mixing a vermicelli-forming powder cooled below 0° C. with fine particulate ice in an atmosphere maintained below 0° C. to obtain a dry mixture of fine particulate ice and vermicelli-forming powder;
   melting the fine particulate ice; and
   compressing the mixture by applying a pressure to the mixture.

2. A powder kneading method comprising the steps of:
   mixing a bread-forming powder cooled below 0° C. with fine particulate ice in an atmosphere maintained below 0° C. to obtain a dry mixture of fine particulate ice and bread-forming powder;

melting the fine particulate ice; and compressing the mixture by applying a pressure to the mixture.

3. A powder kneading method according to claim 2, wherein the fine particulate ice includes sugar, table salt, egg yolk and a dry yeast.

* * * * *